(12) United States Patent
Reiner

(10) Patent No.: US 6,219,676 B1
(45) Date of Patent: *Apr. 17, 2001

(54) METHODOLOGY FOR CACHE COHERENCY OF WEB SERVER DATA

(75) Inventor: Paul Reiner, Sandy, UT (US)

(73) Assignee: Novell, Inc., Provo, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,947

(22) Filed: Aug. 6, 1999

Related U.S. Application Data

(60) Provisional application No. 60/126,746, filed on Mar. 29, 1999.

(51) Int. Cl.[7] ............. G06F 17/30; G06F 17/00; G06F 15/16
(52) U.S. Cl. ............. 707/201; 707/203; 709/219; 709/224
(58) Field of Search ................ 711/141, 144, 711/145; 707/201, 203; 709/201, 219, 224

(56) References Cited

U.S. PATENT DOCUMENTS

| | | | | |
|---|---|---|---|---|
| 4,714,992 | * | 12/1987 | Gladney et al. | 707/206 |
| 5,261,069 | * | 11/1993 | Wilkinson et al. | 711/145 |
| 5,452,447 | | 9/1995 | Nelson et al. . | |
| 5,594,863 | * | 1/1997 | Stiles | 714/15 |
| 5,608,909 | | 3/1997 | Atkinson et al. . | |
| 5,706,435 | | 1/1998 | Barbará et al. . | |
| 5,734,898 | * | 3/1998 | He | 707/203 |
| 5,740,430 | * | 4/1998 | Rosenberg et al. | 707/200 |
| 5,745,906 | * | 4/1998 | Squibb | 707/203 |
| 5,764,241 | | 6/1998 | Elliott et al. . | |
| 5,787,470 | | 7/1998 | DeSimone et al. . | |
| 5,802,297 | | 9/1998 | Engquist . | |
| 5,805,818 | | 9/1998 | Perlman et al. . | |
| 5,815,662 | | 9/1998 | Ong . | |
| 5,826,253 | * | 10/1998 | Bredenberg | 707/2 |
| 5,828,882 | | 10/1998 | Hinckley . | |
| 5,832,483 | | 11/1998 | Barker . | |
| 5,835,943 | | 11/1998 | Yohe et al. . | |
| 5,856,974 | | 1/1999 | Gervais et al. . | |
| 5,864,854 | | 1/1999 | Boyle . | |
| 5,878,213 | | 3/1999 | Bittinger . | |
| 5,878,218 | * | 3/1999 | Maddalozzo, Jr. et al. | 709/213 |
| 5,890,164 | | 3/1999 | Nielsen . | |
| 5,892,914 | | 4/1999 | Pitts . | |
| 5,892,937 | | 4/1999 | Caccavale . | |
| 5,943,675 | * | 8/1999 | Keith et al. | 707/201 |
| 5,999,947 | * | 12/1999 | Zollinger et al. | 707/203 |
| 6,088,694 | * | 7/2000 | Burns et al. | 707/8 |
| 6,098,078 | * | 8/2000 | Gehani et al. | 707/203 |

OTHER PUBLICATIONS

Spector, "The latest, greatest software", PC World, vol. 15, Oct. 1997, pp. 141–144.*

(List continued on next page.)

Primary Examiner—Glenton B. Burgess
Assistant Examiner—Bradley Edelman
(74) Attorney, Agent, or Firm—Haynes and Boone LLP

(57) ABSTRACT

A method and system to establish and maintain cache coherency between a web server and one or more clients communicating through a network. The method includes designating monitor areas on a data segment of the server, determining if an activity occurs in one of the monitor areas, updating a change log if such activity occurs, and indicating the updated status of the change log to the clients. The method also handles requests from the clients and responding to those requests. Clients can then check the change log for updates, instead of resorting to dredging or web crawling.

12 Claims, 4 Drawing Sheets

OTHER PUBLICATIONS

Louboutin, Sylvain R.Y. and Cahill, Vinny. "Comprehensive Distributed Garbage Collection by Tracking Causal Dependencies of Relevant Mutator Events". Department of Computer Science, Trinity College, Dublin 2, Ireland. 1997. pp. 516–525.*

SiteAccelerator V2.1, http://www.netcognition.com/html/sitaccelerator.html, pp. 1–2.

Click2Cache!, http://www.netcognition.com/html/main_bot.html, p. 1.

Mo Drochmal, Israeli Start–Up Speeds Web Browsing, http://www.techweb.com/wire/story/TWB19981125S0008, Nov. 26, 1998, pp. 1–2.

Krishnamurthy, et al., Piggyback server invalidation for proxy cache coherency, http://www7.scu.edu.au/programme/fullpapers/1844/com1844.htm, Apr. 28, 1999, pp. 1–11.

Krishnamurthy, et al., Study of Piggyback Cache Validation for Proxy Caches in the World Wide Web, http://www.usenix.org/publications/library/proceedings/usits97/krishnamurthy.html.html, pp.1–2.

* cited by examiner

METHODOLOGY FOR CACHE COHERENCY OF WEB SERVER DATA

CROSS REFERENCE

This application claims the benefit of copending patent application U.S. Ser. No. 60/126,746 filed on Mar. 29, 1999.

BACKGROUND

The invention relates generally to computer networks, and more particularly, to an apparatus and method for maintaining cache coherency between a web server and its clients.

Personal computers or workstations may be linked in a computer network to allow the sharing of data, applications, files, and other resources. In a client/server network, the sharing of resources is accomplished through the use of one or more file servers. Each file server includes a processing unit that is dedicated to managing centralized resources and to sharing these resources with other file servers and/or various personal computers and workstations, which are known as the "clients" of the server.

Each client includes a central processing unit ("CPU"), a memory which is directly accessible to the CPU, and one or more input/output ("I/O") devices such as a screen, keyboard, mouse, and the like. The client's memory may be battery-backed, but more often the memory is volatile memory (e.g., random access memory or "RAM") that loses data if power to the client is interrupted or if the client is rebooted. Some clients also have local non-volatile data stores, such as a local hard disk, while other clients have no local non-volatile store.

Each file server has a CPU, a volatile memory, various I/O devices, and at least one non-volatile data store. The non-volatile data store includes a controller and a non-volatile medium. To access the medium, the server's CPU sends read and write requests to the controller, which then attempts to carry out the request. Write requests are accompanied by file data which is destined for storage on the medium, or by a memory address identifying the present location of such data. Read requests are accompanied by a memory address which identifies memory destined to receive file data copied from the medium.

One example of a client/server network is a centralized web server that serves a distributed network of cache servers. The web server acts as a hub for distributing data back and forth between the cache servers and other clients, as well as providing unique data specific to the web server. The cache servers may contain unique information or they may simply mirror the information found on the web server. Alternatively, the cache servers may contain unique information and also mirror all or part of the web server data, allowing each cache server to present customized information that is tailored to meet a specific set of needs.

In a more explicit example, a major car manufacturer (hereinafter "Manufacturer") may operate a web server with data for all of its products and services. In this example, Manufacturer wants to provide rich, up-to-the-minute, multimedia web information at each dealer location (there may be thousands of dealers), while still being able to centrally manage the information. Centralized management allows Manufacturer to control the quality of information available, provide timely updates and additions, and ensure uniformity among its dealers, along with other benefits too numerous to mention. Information provided by Manufacturer could include: online versions of all maintenance manuals, video clips of new cars and sales pitches, the ability to online order custom tailored cars, the ability to track recalls, the ability to locate an existing new vehicle at any other dealer, and/or a comparison of Manufacturer product versus competitors. This data is very large and downloading it to the dealers could take hours. No dealer or customer is willing to wait for the data to be downloaded during a single session, so the data must be readily available when requested if it is to be useful.

The normal solution to the problem is to place a cache server (like Novell's Border Manager) at each Manufacturer dealer to accelerate delivery. In addition, this enables the dealer to include information for that particular dealer. However, this solution creates additional problems. For one, the cache server must maintain coherent, or up-to-date, data to guarantee correct information while maintaining timely user access times. Therefore, the cache server must sustain critical performance and reduce or eliminate cache misses. Also, conventional cache servers must periodically ping, or query, the origin web server to blindly search for new and/or updated material. These queries create huge amounts of network traffic and web server congestion.

Therefore, what is needed is a system and method that allows web data to be immediately accessible at various locations in a networked server/client arrangement.

Also what is needed is a system and method that provides up-to-date information at various locations in a networked server/client arrangement.

Furthermore, what is needed is a system and method that does not congest servers and/or networks with unnecessary traffic.

SUMMARY

The present invention, accordingly, provides a method and system to establish and maintain cache coherency between a web server and its clients. To this end, in one embodiment the system for maintaining cache coherency includes a processor for running operating code, a storage unit for storing a data segment having at least one monitor area and a change log, and an interface to a client computer. The system includes instructions for determining if an activity occurs to the monitor area, updating the change log if the activity occurs, and indicating the updated status of the change log to the client computer. It also contains instructions for receiving a request from the client computer and for responding to the request.

In another embodiment, the method maintains cache coherency by defining at least one monitor area for the web server data, maintaining a change log at the web server, determining if an activity occurs to the monitor area and, if an activity occurs, updating the change log in response to the activity. This notifies a client to the web server of the activity through the change log, thereby maintaining coherency with the web server.

In yet another embodiment, the method allows a client computer to access a web server in order to maintain cache coherency. The method involves determining if a change log maintained by the web server has changed, analyzing the changes that have occurred in the change log since the change log was last checked, requesting data from the web server that is new or altered according to the change log, and retrieving the data from the web server.

In still another embodiment, the method allows a client computer to initially establish cache coherency by checking whether contact has been previously established with a designated web server, checking whether an initial data retrieval from the web server has been completed, and directing the client to contact the web server for the purpose of retrieving at least a portion of a data segment stored on the web server. The method further involves analyzing a change log maintained by the web server to determine the current contents of the data segment on the web server, requesting the data comprising the current contents as indicated by the change log from the data segment maintained by the web server, and retrieving the data from the web server so that coherency with the web server can be established.

DETAILED DESCRIPTION

Figure 1:
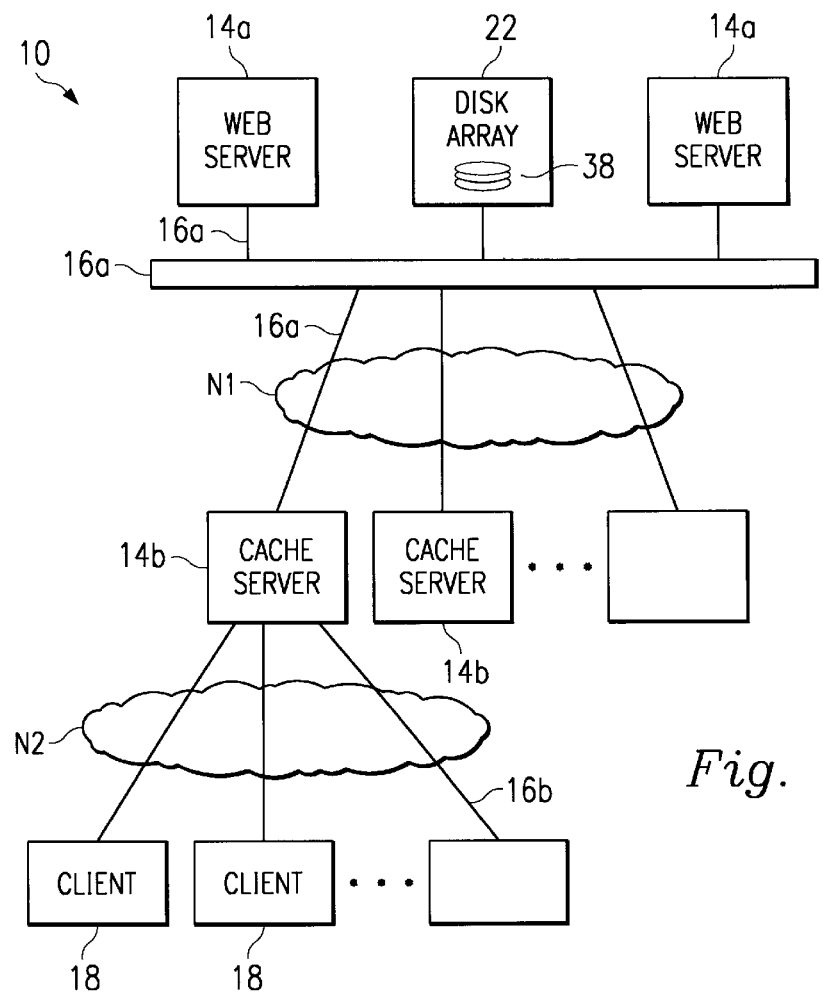
FIG. 1 illustrates a computer network on which the present invention might be employed.

The present invention can be described with several examples given below. It is understood, however, that the examples below are not necessarily limitations to the present invention, but are used to describe typical embodiments of operation. Before the embodiments are further discussed, however, a more detailed review of specific problems associated with a client/server network is provided below.

Cache Miss Problem

Caches work on the theory that common items are requested over and over. Thus when the request for a specific data item is made the first time, a cache "miss" occurs (i.e., the cache doesn't contain the data requested) and the cache server must go and retrieve it, resulting in a significant delay. Subsequent requests for the same data item, however, can be handled quickly since the requested data item is stored in the cache.

This works well in some situations, but not in others. For example, a user may become frustrated by the delay when trying to obtain information that has not been previously requested. Furthermore, on systems containing rapidly changing or large amounts of information, it is unlikely that a specific data request will have been previously made. This results in a high number of cache misses, necessitating frequent data retrievals and accompanying delays. An hour delay is not uncommon.

Network Traffic Problem

A side effect of the cache solution is the fact that cache servers must periodically ask the web server whether its information is "stale" (i.e., not coherent with the web server from which the data originates) and whether new information at the web server is available. Even if the cache miss rate is relatively low, this background work, of which the end user is unaware, can take hours to complete and can clog networks. Since many requests must be routed through other servers before reaching the web server that is being checked, the entire network can suffer reduced performance. The network problem is compounded if the cache server is making frequent data requests due to a high cache miss rate.

Web Server Congestion Problem

Related to the network traffic problem, each of the potentially thousands of cache servers (in the present example) contacting the origin web server causes a load on the web server for every request they make. A request may be for a web page, a graphic file, an audio file, or any other file that can be stored and retrieved in a digital format. Each request can easily generate other requests, exponentially increasing the load on the web server. For example, if a cache server requests a web page on which there are five different graphics, the cache server must then retrieve those graphics. If the web server is configured to look for additional information, such as server side includes ("SSI"), then an additional load is imposed. SSI allows variable-based instructions to be placed on a web page. The web server parses the web page for the variables and then inserts the variable information before responding to the web page request. This server overhead must be performed for each requested page that might contain SSI instructions and can drastically reduce server performance.

The web server must divert resources to handle each request as it is received, and will eventually run out of resources if enough cache servers send requests at the same time. Even if the web server has the resources to handle each request, the delay in response time can quickly increase to the point that the cache servers will quit waiting and return a time out signal to the user that the web server is not responding. This congestion problem is so large that it has been shown to effectively kill the web server.

Cache Coherency Problem

At install time, each cache server (e.g., the dealer cache computer) is initially empty. Through some process, that cache server needs to be filled such that it holds a mirror image of the origin web server. After that time, it must be kept up to date.

The only solution is a technology called "dredging" or "web crawling." This technology works by starting at the topmost web page and downloading it. Then it looks for all links on that page and downloads them. This is done recursively until no more pages are available. After initially downloading the web site, the web crawler repeats this process every few hours forever to ensure that the most current version of the site is available.

The problem is that web crawling downloads the entire site every time, because it has no understanding of what is new and what is the same, resulting in huge performance penalties (typically less than 1% of a site changes regularly). Not only is the cache server from which the download request is originating repeatedly making multiple requests (potentially thousands, depending on the number of links to be followed), but web crawling actually misses some data.

Web Crawling Misses

As web sites become more sophisticated, web authors have grown more reliant on dynamic information such as that generated by interactive scripts using the common gateway interface ("CGI"). CGI enables the web server to receive user input, which it then passes to an application designated to handle that input. The user input can then be used to generate customized links and web pages that are tailored to the specific customer. This type of interactivity enables web servers to be more flexible, but also increases the complexity of the information that is generated because links are no longer always present on a web page before a specific query is made.

For example, Manufacturer produces a highly popular sedan (hereinafter "Sedan"), and includes information about Sedan on its web server. While a web crawler can locate simple pages such as www.sedan.manufacturer.com because everything is known ahead of time, crawlers cannot get pages that are calculated at run time such as www.modelchosenbyuser.manufacturer.com because the crawler has no idea what model will be chosen in the future, nor does it have any idea what choices are possible. These web pages, therefore, are guaranteed to be missed by dredging. The result is that the cache will not have the web page when it is requested by a user, resulting in a very unpleasant customer experience. Further aggravating the problem is that dynamic links often contain the most important information to a user since they are generated in response to a specific request.

The solution to the previously discussed problems is to attack them from the web server. Instead of making the cache servers work harder or be smarter, the present invention provides a method for the origin web server to intelligently communicate the complete list of changed content in a manner that requires no human supervision. This reduces the network load, while also utilizing the fact that the web server stores and controls the data that the cache server needs.

Referring now to FIG. 1, one of many networks suited for use with the present invention is designated generally by reference numeral 10. In this embodiment, the network 10 includes Novell NetWare® software, version 4.x (NetWare is a registered trademark of Novell, Inc.). The illustrated network 10 includes several connected local networks N1, N2. The networks N1, N2 may be separate networks which are connected though the Internet or world wide web, or they may be part of an Intranet or other private network. Alternatively, N1, N2 may be components of a single network or hard wired directly together. Each network N1, N2 includes signal lines 16a, 16b, respectively, which connect file servers 14a, 14b to one or more clients 18. The clients 18 include personal computers and workstations. The signal lines 16a, 16b typically include twisted pair, coaxial, or optical fiber cables, but may also include transmission means such as telephone lines, satellites, and microwave relays. Although a particular network 10 is shown, those of skill in the art will recognize that the present invention is also useful in a variety of other networks.

In continuance of the example discussed above, the server 14a will be designated as the web server that is used by the automobile manufacturer and the server 14b represents a cache server that is used by one of the automobile dealers. The signal lines 16a therefore represent the Internet or world wide web, while the signal lines 16b represent an Intranet at a particular dealer. Alternatively, the signal lines 16b may also represent the Internet. It is understood that these designations are merely for example and that many different configurations of systems and networks can be used to implement the present invention.

Figure 2:
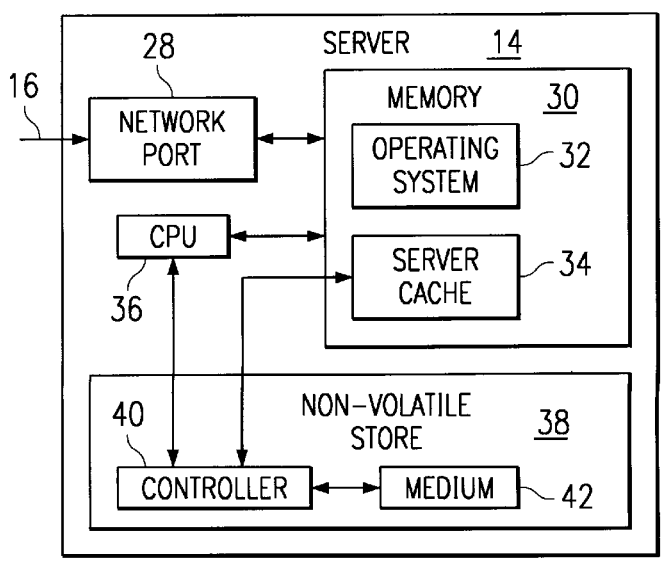
FIG. 2 illustrates a server configuration which could utilize the present invention.

Referring now to FIG. 2, the servers (generally represented by numeral 14) include a network port 28 which allows the servers to read packets from, and write packets to, the signal lines (generally represented by numeral 16) that carry packets between the servers and/or the client 18. The network port 28 includes hardware and software familiar to those in the art, and the packets are organized, transmitted, and interpreted in a manner that is readily determined by those of skill in the art.

The servers 14 also include a server memory 30. Typical embodiments of the server memory 30 include random access memory chips ("RAM") which form a volatile data store and non-volatile stores, such as magnetic hard disks, magnetic floppy disks, optical disks, CD-ROM disks, and magnetic tape.

It is well known that each such data store includes a substrate such as a magnetic material which is capable of storing data in physical form. According to the present invention, the substrate of the server memory 30 is given a specific physical configuration that causes the server 14 to operate in the manner taught herein. A first portion of the server memory 30 stores a server operating system 32. The server operating system 32 includes familiar operating system capabilities. However, these familiar capabilities are supplemented, modified, and/or replaced in a manner readily determined by those of skill in the art by the file recovery capabilities of the present invention.

A second portion of the server memory 30 stores a server cache 34. In the illustrated embodiment, the server cache 34 is logically outside the server operating system 32. In alternative embodiments the server cache 34 is part of the server operating system 32.

The servers 14 also include a central processing unit ("CPU") 36. The CPU 36 may be any familiar CPU, including without limitation commercially available complex instruction set and reduced instruction set microprocessors. The CPU 36 may also be implemented as a set of connected multiprocessors.

In addition, the servers 14 may include a second non-volatile store 38. The non-volatile store 38 is often physically located near the CPU 36 and the server memory 34, but in some embodiments the non-volatile store 38 is accessed over a signal line 16. Thus, three separate portions of the disk array 22 in FIG. 1 could be the non-volatile stores 38, respectively, of the two servers 14a, 14b shown. Alternatively, the entire disk array 22 could be the non-volatile store 38 of a single server 14a. Those of skill in the art will readily determine ways in which to make the non-volatile store 38 accessible to the servers.

The non-volatile store 38 includes a controller 40 of a type familiar to those of skill in the art, such as a disk controller. The controller 40 is in control signal communication with the CPU 36 and in data transfer communication with the server cache 34. Thus, the CPU 36 is capable of sending read and write requests to the controller 40. A read request requests the controller to read data from a non-volatile medium 42 (such as a magnetic disk medium) and to place a copy of that data at a specified location in the server cache 34. A write request requests the controller to write data to the non-volatile medium 42 and to then acknowledge to the CPU 36 that the write has been completed. The write request includes either a copy of the data to be written or, more commonly, the address of a memory location within the server cache 34 where the data to be written is presently located. The manner in which read and write requests are made and acknowledged is generally familiar to those of skill in the art, but the generation of such requests according to the present invention is novel.

Figure 3:
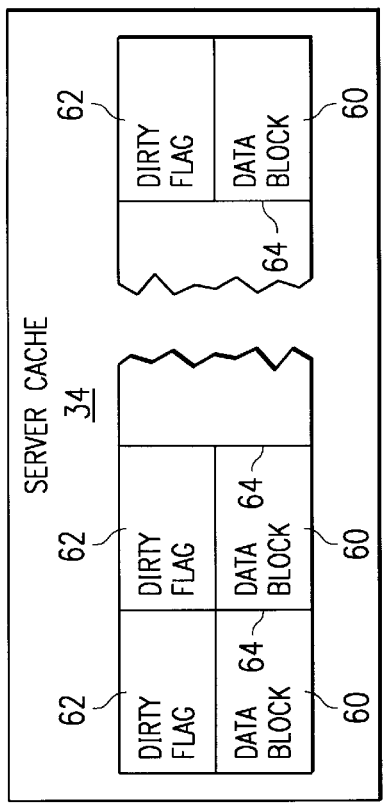
FIG. 3 illustrates one embodiment of a server cache.

With reference to FIGS. 2 and 3, one embodiment of the server cache 34 includes a plurality of server cache data blocks 60 and a corresponding plurality of stale flags or dirty flags 62. Each server cache data block 60 is configured for temporary storage of a block of file data. As used herein, "file data" includes without limitation user-generated data and system structures maintained in familiar file systems such as the 12--bit and 16-bit File Allocation Table ("FAT") file systems first used by the MS-DOS® operating system (MS-DOS is a registered trademark of Microsoft Corporation), and analogous data maintained in the High Performance File System ("HPFS").

Those of skill in the art will readily determine both the appropriate size of each server cache data block 60 and the number of server cache data blocks to locate within the server cache 34. Although the blocks 60 illustrated are in one large contiguous region of server memory 30, it will be appreciated that two or more separate regions of the memory 30 are used in other embodiments, with each separation between regions being aligned on a boundary 64 between two data blocks 60.

In some embodiments, the dirty flags 62 are all stored together as bits in an array of bits associated with one of the data blocks 60. In other embodiments, each dirty flag 62 is stored in a bit located physically near the data block 60 to which the flag 62 corresponds. In alternative embodiments, the dirty flags 62 are non-zero indexes or pointers in a list which holds the allocated data blocks; blocks which are still available are not referenced on the list. The list is typically arranged in LRU order, that is, with "least recently used" blocks near the front of the list. In some embodiments, each dirty flag 62 is represented as a pair of indexes which define a region of data, with the dirty flag 62 clean state occurring when the indexes define an empty region and the dirty state occurring when the indexes define a non-empty region.

Figure 4:
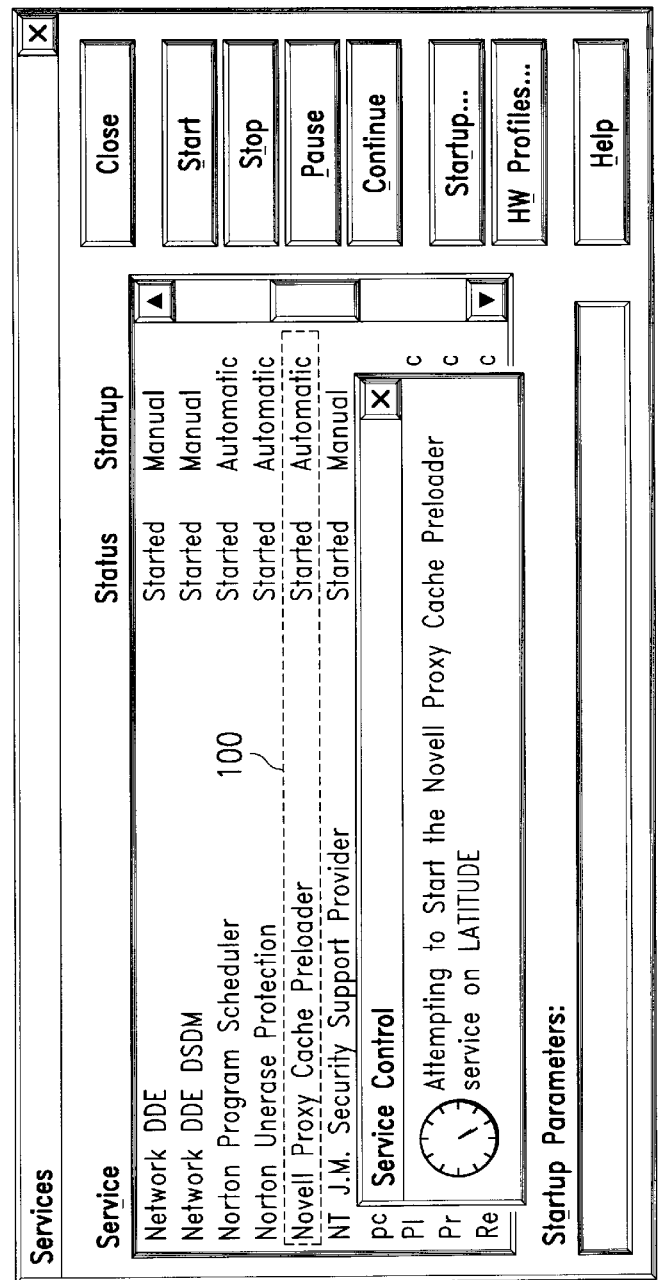
FIG. 4 illustrates a display for a routine that may be run on the web server of FIG. 2 to maintain cache coherency.

Referring now to FIG. 4, a display 98 can be used to initiate and control a routine 100 that may be run on the web server 14a. In one embodiment, the routine 100 is implemented as an NT service for Windows NT web servers. Other embodiments of the routine 100 may be implemented as a daemon for Unix web servers and so forth. In the present embodiment, the routine 100 is implemented as an application program interface ("API").

Figure 5:
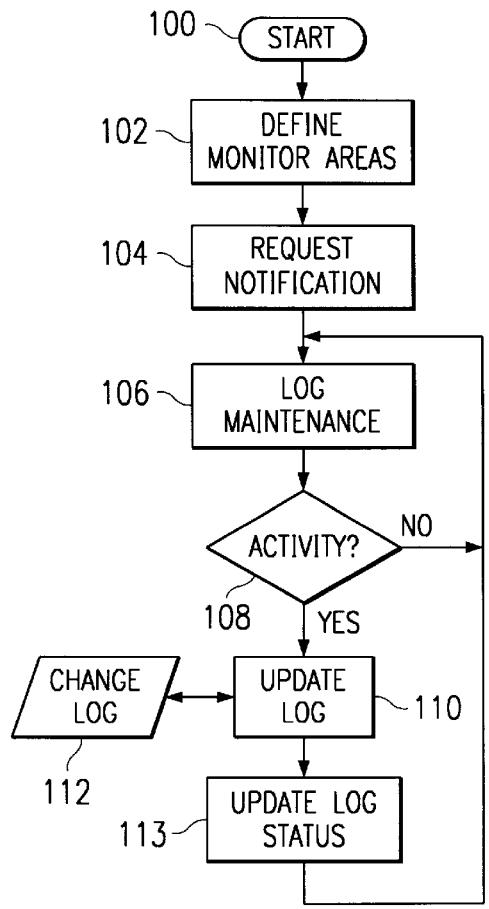
FIG. 5 is a flow chart for the routine of FIG. 4.

FIG. 5 illustrates one embodiment of the routine 100 initiated and controlled in the display 98 of FIG. 4. At step 102, the routine reads configuration information that indicates what areas of the server 14a are to be monitored. This defines certain areas of the server 14a that are used to provide web content. Monitor areas may or may not include all the web content that is available on the server, but do include the content that is to be readily available to the cache server 14b. At step 104, the routine then registers with the operating system of the server 14a indicating it wants to be notified of any activity in the defined areas. At step 106, the routine performs a log maintenance routine discussed in greater detail with respect to FIG. 6. At step 108, the routine 100 monitors for any activity in the defined areas. If no activity is detected, execution returns to step 106.

At step 110, when content is added, changed, or deleted, the routine creates or updates a log 112 of such an event in a predefined location. Finally, step 113 updates the status of the change log so that the cache server 14b will know that it has been changed. This update may be in the form of a time stamp located in a designated area of memory on the web server 14a that is accessible to the cache server 14b, so that the cache server can compare the time stamp with the time it last checked the change log 112. Alternatively, the time stamp could be contained in the change log 112, so that the cache server 14b can read the change log to determine whether an update has occurred. If the time stamp is more recent than the last update time recorded by the change log 112, then the cache server will know that the change log 112 has been altered. Execution then returns to step 106. Thus the cache server 14b can look in the predefined location for a complete exact list of new/changed content and download the minimum information necessary to maintain coherency. At any time, the cache server 14b can read the change log 112 to locate all new/changed content and contact the web server 14a accordingly. The activity of cache server 14b is later described in further detail with respect to FIG. 7.

Since the change log 112 is authoritative, the cache server 14b can then stop dredging/crawling the entire web server 14a and set its cache object timeout to infinity. As a result, the ping queries to the web server 14a are stopped. This decreases both overall network load and web server load.

Figure 6:
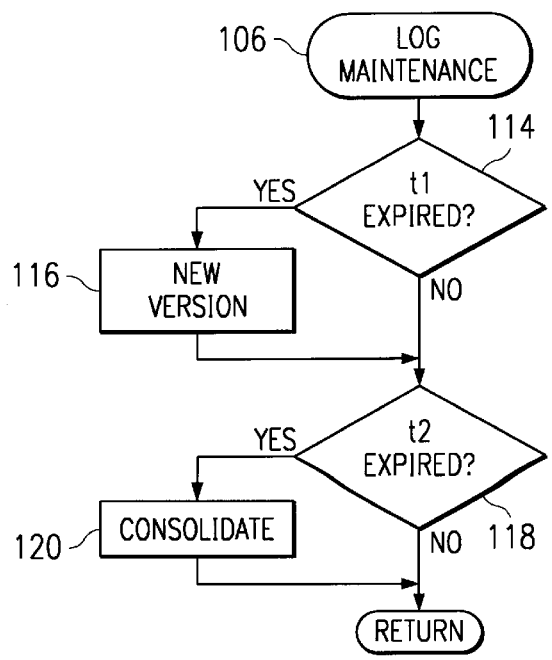
FIG. 6 is a flow chart for a change log maintenance routine.

Referring also to FIG. 6, if there were only one change log 112, then that log would eventually grow so large as to negatively affect performance. Therefore, the log maintenance routine 106 keeps the change log 112 at a relatively small and workable size. At step 114, if a predetermined time t1 (e.g., a few hours or days, depending on the size of the site and the frequency with which it is updated) has elapsed, the routine 106 proceeds to step 116 where it closes the current version of the change log 112 and opens a new version. Alternatively, the change log could be closed and a new version opened if a certain number of changes have been made or if the log reaches a certain size. At step 118, if a second predetermined time t2 (e.g., a few days or other selected time period) has elapsed, the routine 106 proceeds to step 120 where it consolidates all the older versions of the change log and builds a new consolidated log 120.

The consolidated log 120 holds entries for every object on the web server 14a as well as the changes. The consolidated log 120 may simply be a chronological compilation of all changes made or changes may be identified by file type (graphic, web page), section or directory (used cars, new cars), or by some other means. Alternatively, the consolidated log may contain only changes that will impact a download request. For example, if a web page was added and then later removed, the consolidated change log may not hold a reference to the page because it would serve no purpose. This has the advantage of keeping the consolidated log as small as possible, while still retaining all relevant information.

Consolidating the change log is desirable because, in the above example, if a new dealer is added, they will initially need the entire list of entries and then roll forward with only the changes from there on. Also, if at anytime the cache server 14b feels that the log file 110 is too large, or if it suspects a cache corruption, it can dump its cache and follow the log file containing all entries to entirely repopulate its cache.

Table 1 below provides an example of the change log 112. The entries of the change log include an action (e.g., add, remove, change) and a Uniform Resource Locator ("URL").

TABLE 1

| Action | URL |
| --- | --- |
| add | //www.manufacturer.com/bluesedan.gif |
| replace | //www.manufacturer.com/hompage.html |
| add | //www.manufacturer.com/redsedan.gif |
| remove | //www.manufacturer.com/greensedan.gif |

Note that this information is granular to the object level, thus it is the minimal unit of information possible. This means the client would not have to retrieve an entire page of information just because one picture changed. Note also that this solves the problem with computed or runtime URLs. To update the log file 112 (Table 1), the routine 100 converts the URL as needed for virtual directory support and/or virtual server support, locks the log file so that the server 14b cannot access it, updates the Table 1, and then unlocks the log file. The cache server, therefore, receives the URL in a form that it can readily apply.

In continuance of the above-mentioned example, if a customer is choosing a specific Sedan from Manufacturer, he/she will see that there are no green Sedans available, but only a red and a blue Sedan. This information appears quickly because the objects are in the cache server 14b due to the fact that the web server 14a told the cache server what possible colors were available. The end result is a rapid and current response, resulting in a much more positive customer experience.

Figure 7:
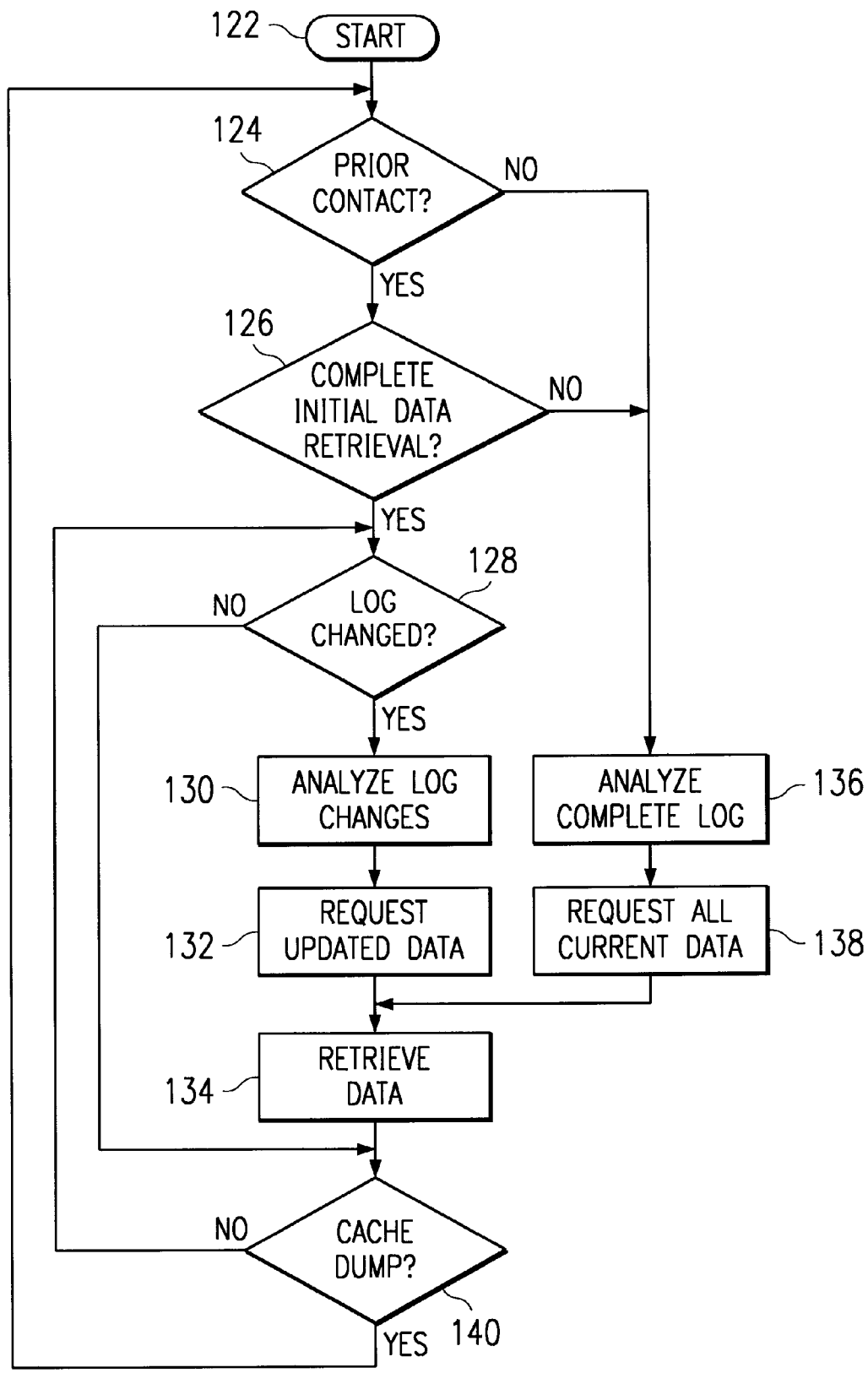
FIG. 7 is a flow chart for a client routine to ensure that it is maintaining cache coherency.

In FIG. 7, a method 122 more clearly details a routine that would enable a cache server to ensure that it contains the current web server 14a data as indicated by the change log 112 of FIG. 5. At step 124, the cache server 14b determines whether it has previously made contact with the designated web server 14a. If not, the cache server 14b then proceeds to contact the web server 14a in step 136 and analyze the complete change log 112 (including the consolidated version) to determine the current contents of the data segment to be mirrored. Once the cache server 14b determines the data required to establish initial cache coherency with the web server 14a, it then issues a request to the web server 14a and retrieves the data in step 138. If prior contact has been made, the cache server 14b proceeds to step 126 and checks to make sure that a full data download occurred. If for some reason the initial download failed to retrieve the requested information, the cache server 14b reestablishes contact with the web server 14a and, following steps 136 and 138, initiates a new download request for all current data. Alternatively, cache server 14b could contain instructions to download only the remainder of the data that it failed to obtain originally.

If the initial download was completed successfully, the cache server 14b only needs to determine if the change log 112 has been altered since it was last checked by the cache server. This can be accomplished by checking the time stamp maintained by the web server 14a as previously described. If the time stamp indicates that the change log 112 has changed, the cache server 14b then proceeds to step 130, where it analyzes the change log for added, deleted, or modified data. A request is then sent to the web server 14a for the data required to update the cache server 14b as indicated by the change log 112. The cache server 14b receives the data and completes the update to reestablish cache coherency. After finding an unaltered log or after completing the retrieval process, if the cache server 14b feels its cache is corrupted, it can simply dump its cache in step 140 and begin the download process as though initial contact had never been established. This allows the cache server 14b to automatically maintain cache coherency based on a predetermined set of factors.

The interaction between the web server 14a and the cache server 14b as described above, therefore, facilitates the automatic delivery of current information to end users. Network congestion is reduced, as web crawling and cache misses no longer occur. The total number of web server requests are also reduced, because the web server is no longer responding to requests to repetitively download its entire contents. As a result, web server overhead is reduced, allowing the server to respond to more clients in a shorter amount of time. Once coherency is initially established, the cache server only requests the minimal amount of data necessary to maintain cache coherency with the web server, resulting in a highly efficient server/client relationship.

It is understood that several modifications, changes and substitutions are intended in the foregoing disclosure and in some instances some features of the invention will be employed without a corresponding use of other features. For example, although the present invention was discussed using the Internet/world wide web, it may be employed on any system which utilizes remote file storage and retrieval, including an Intranet or any other network system. Furthermore, the terms "client" and "server" may refer to any computers, including but not limited to personal computers, workstations, or dedicated network computers such as web servers and cache servers, that are configured to serve, retrieve, or route files or other data packets on a network. Accordingly, it is appropriate that the appended claims be construed broadly and in a manner consistent with the scope of the invention.

What is claimed is:

1. A method for allowing a web server to maintain coherency of web server data with a plurality of clients, the web server data comprising a plurality of web pages, each web page comprising a plurality of objects, the method comprising the steps of:

defining at least one monitor area for the web server data;

detecting at least one activity that occurs in the monitor area, the activity being a change to a web page;

storing a reference value for the activity in at least one version of a change log at the web server, the change log being of a relatively small size, as compared to the monitor area, and the reference value indicating an object of the web page that has been changed by the activity;

indicating a time when the reference value was stored in the change log, the time being accessible by a client for determining whether to retrieve the object identified by the reference value; and providing the reference value to the client when the client accesses the web server, if the client so determines, thereby maintaining coherency with the web server, wherein the change log is separate from the web server data and the tracked activity is immediately provided to the client without accessing the web server data.

2. The method of claim 1 further comprising the step of requesting notification of an activity in the defined monitor areas.

3. The method of claim 1 further comprising the step of indicating the updated status of the change log by a flag to the client, so that the client can know that the change log has been updated by checking the flag.

4. The method of claim 1 wherein the reference value is a uniform resource locator.

5. A web server comprising:

a processor for running operating code;

a storage unit for storing a data segment having at least one monitor area and at least one version of a change log of a smaller size than the monitor area, the monitor area including a plurality of web pages each web page, referencing a plurality of objects;

an interface to a client computer; and a plurality of stored instructions, including:

an instruction for determining if an activity occurs to a web page in the monitor area;

an instruction for updating the change log if the activity occurs by providing a reference to an object to which the activity occurred;

an instruction for indicating the updated status of the change log to the client computer upon receipt of a request by the client computer, the updated status including a time that the change log was updated with the reference;

an instruction for receiving the request from the client computer; and an instruction for responding to the request by providing the reference to the client computer so that the client computer can update an internal value for the object.

6. The web server of claim 5 wherein the instruction for indicating the updated status of the change log to the client utilizes a flag.

7. A computer program stored on a computer readable media comprising instructions for:

identifying a data monitor area, the data monitor area including at least one web page comprising a plurality of objects;

maintaining at least one version of a change log of a predetermined workable size for tracking changes to objects of the web page on an object-by-object basis by listing a reference to the object;

receiving a request to update a client; and indicating the updated status of the change log to the client by allowing the client to access the change log, so that the client can be notified of the tracked changes to the objects through the change log, wherein the change log is separate from the data monitor area and the reference to the object is identifiable in the change log by the client without searching the data monitor area.

8. The computer program of claim 7 further comprising instructions for:

determining if a first time period has expired, and if a first time period has expired, creating a new version of the change log, the new version of the change low residing with the prior version of the change low at the web server, wherein the instructions for storing includes identifying a latest version of the change log for receiving the reference value.

9. The computer program of claim 8 further comprising instructions for determining if a second time period has expired, and if so, consolidating any prior versions of the change log.

10. The program of claim 9 wherein the change log is consolidated by combining all previous change logs.

11. The computer program of claim 7 wherein the instruction for indicating the updated status of the change log utilizes a flag.

12. The program of claim 7 wherein the instructions for maintaining further includes:

determining when an activity occurs in the data monitor area; and updating the change log in response to the activity occurred.

* * * * *